(12) United States Patent
Jang et al.

(10) Patent No.: US 12,519,395 B2
(45) Date of Patent: Jan. 6, 2026

(54) ELECTRONIC DEVICE, POWER SUPPLY DEVICE, AND CONTROL METHOD THEREOF

(71) Applicant: SAMSUNG ELECTRONICS CO., LTD., Suwon-si (KR)

(72) Inventors: Duhee Jang, Suwon-si (KR); Sanghoon Lee, Suwon-si (KR); Jeongil Kang, Suwon-si (KR); Wonmyung Woo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 293 days.

(21) Appl. No.: 18/200,890

(22) Filed: May 23, 2023

(65) Prior Publication Data

US 2024/0048055 A1    Feb. 8, 2024

Related U.S. Application Data

(63) Continuation of application No. PCT/KR2023/006296, filed on May 9, 2023.

(30) Foreign Application Priority Data

Aug. 5, 2022  (KR) ........................ 10-2022-0097953

(51) Int. Cl.
    *H02M 3/335* (2006.01)
    *H02M 1/00* (2007.01)
    *H02M 1/42* (2007.01)

(52) U.S. Cl.
    CPC ..... *H02M 3/33523* (2013.01); *H02M 1/0012* (2021.05); *H02M 1/0022* (2021.05); *H02M 1/4208* (2013.01)

(58) Field of Classification Search
    CPC ...... H02M 1/00; H02M 1/0032; H02M 1/322; H02M 1/0022; H02M 1/0012;
    (Continued)

(56) References Cited

U.S. PATENT DOCUMENTS 7,102,110 B2    9/2006  Shinohara
7,933,131 B2 *  4/2011  Cho ................ H02M 3/33561
                                                323/267
(Continued)

FOREIGN PATENT DOCUMENTS

CN    112152464 A  * 12/2020
JP    7-104711       4/1995
(Continued)

OTHER PUBLICATIONS

Machine translation CN-112152464-A (Year: 2020).*
(Continued)

*Primary Examiner* — Thienvu V Tran
*Assistant Examiner* — Yahveh Comas Torres
(74) *Attorney, Agent, or Firm* — STAAS & HALSEY LLP

(57) ABSTRACT

An electronic device comprises a power supply device to generate a driving voltage and a standby voltage and a main body operated based on the driving voltage and the standby voltage received from the power supply device. The power supply device includes at least one converter to output at least one of the driving voltage and the standby voltage from an output end, a first capacitor connected to the at least one converter to store the driving voltage, a second capacitor connected to the at least one converter to store the standby voltage, and a discharge circuitry electrically connected with the first capacitor to discharge the driving voltage stored in the first capacitor.

13 Claims, 7 Drawing Sheets

(58) Field of Classification Search
CPC .... H02M 1/4208; H02M 1/008; H02M 3/335;
H02M 3/33523; H02M 3/28; G09G 3/20;
G09G 2330/022
See application file for complete search history.

(56) References Cited

U.S. PATENT DOCUMENTS

| | | | |
|---|---|---|---|
| 8,339,192 B2 | 12/2012 | Busch | |
| 8,416,584 B2* | 4/2013 | Zhan | H02M 3/33507 363/21.12 |
| 8,436,590 B2 | 5/2013 | Funaba et al. | |
| 8,937,471 B2 | 1/2015 | Kobayashi et al. | |
| 9,099,927 B2* | 8/2015 | Choi | H02M 3/33561 |
| 9,470,739 B2 | 10/2016 | Govindaraj et al. | |
| 10,110,142 B2 | 10/2018 | Outram | |
| 10,199,923 B2* | 2/2019 | Li | H02M 1/32 |
| 10,424,251 B2 | 9/2019 | Song | |
| 11,695,323 B2* | 7/2023 | Lifschits | H02M 1/36 363/132 |
| 12,174,681 B2* | 12/2024 | Jang | H02M 1/0032 |
| 2011/0103103 A1* | 5/2011 | Zhan | H02M 3/33507 363/21.15 |
| 2011/0122662 A1* | 5/2011 | Li | H02M 1/32 363/49 |
| 2014/0184482 A1* | 7/2014 | Zhang | G09G 3/36 345/87 |
| 2014/0368742 A1* | 12/2014 | Joo | H04N 5/63 363/21.01 |
| 2015/0034406 A1 | 2/2015 | Hirose | |
| 2016/0079872 A1* | 3/2016 | Ryu | H02M 3/156 363/21.04 |
| 2018/0219470 A1* | 8/2018 | Li | H02M 1/32 |
| 2020/0083816 A1 | 3/2020 | Kim et al. | |
| 2021/0203220 A1* | 7/2021 | Lifschits | H02J 3/388 |
| 2023/0152874 A1* | 5/2023 | Jang | G09G 3/20 713/323 |

FOREIGN PATENT DOCUMENTS

| | | | | |
|---|---|---|---|---|
| JP | 2001-95261 | | 4/2001 | |
| JP | 2011-10295 | | 1/2011 | |
| JP | 2012-170289 | | 9/2012 | |
| JP | 2016-39641 | | 3/2016 | |
| JP | 2017-45653 | | 3/2017 | |
| KR | 2003-0021947 | | 3/2003 | |
| KR | 10-2008-0024321 | | 3/2008 | |
| KR | 20-2009-0003906 | | 4/2009 | |
| KR | 10-2022-0008617 | | 1/2022 | |
| KR | 20220008617 A | * | 1/2022 | ........... G06F 1/3296 |

OTHER PUBLICATIONS

Machine translation of KR-20220008617-A (Year: 2022).*
International Search Report issued on Aug. 16, 2023 in International Patent Application No. PCT/KR2023/006296.
Written Opinion issued on Aug. 16, 2023 in International Patent Application No. PCT/KR2023/006296.
Supplementary European Search Report dated Apr. 11, 2025 issued in European Application No. 23 85 0201.

* cited by examiner

ELECTRONIC DEVICE, POWER SUPPLY DEVICE, AND CONTROL METHOD THEREOF

CROSS-REFERENCE TO RELATED APPLICATIONS

This application is a continuation application of International Application No. PCT/KR2023/006296 designating the United States, filed on May 9, 2023, in the Korean Intellectual Property Receiving Office, which claims priority from Korean Patent Application No. 10-2022-0097953, filed on Aug. 5, 2022, in the Korean Intellectual Property Office, the disclosures of which are hereby incorporated by reference herein in their entireties.

BACKGROUND

Field

The disclosure relates to an electronic device having a discharge circuitry, a power supply device, and a control method thereof.

Description of Related Art

The growth of the intelligent society leads to increased demand for image display devices and use of various types of display devices, such as liquid crystal displays, organic light emitting displays, etc.

Displays may be divided into an emissive type, such as cathode ray tube (CRT), light luminescence (EL), light emitting diode (LED), vacuum fluorescent display (VFD), field emission display (FED), plasma display panel (PDP), and organic light emitting diode (OLED), and a non-emissive type, such as liquid crystal display (LCD), which is not self-emissive.

Meanwhile, the display needs to output light of an appropriate intensity or more over the entire screen, and during the course, may cause significant power consumption and heat during driving.

SUMMARY

The electronic device according to an embodiment of the disclosure may comprise a power supply device to generate a driving voltage and a standby voltage. In an embodiment, an electronic device may comprise a main body operated based on the driving voltage and the standby voltage received from the power supply device. In an embodiment, the power supply device may include at least one converter to output at least one of the driving voltage and the standby voltage from an output end, a first capacitor connected to the at least one converter to store the driving voltage, a second capacitor connected to the at least one converter to store the standby voltage, and a discharge circuitry electrically connected with the first capacitor to discharge the driving voltage stored in the first capacitor.

In an embodiment, the discharge circuitry may include at least one dummy resistor and a group of discharge transistors connected in series with the dummy resistor.

In an embodiment, the power supply device may include a first controller to switch an electrical connection state of the at least one dummy resistor. In an embodiment, the first controller may provide a voltage for activating the group of discharge transistors electrically connected with the at least one dummy resistor.

In an embodiment, the gate electrodes of the group of discharge transistors may be jointly connected through one node. In an embodiment, a source-drain electrode on one side of the group of discharge transistors may be electrically connected with the at least one dummy resistor.

In an embodiment, the electronic device further comprises a first divider resistor and a second divider resistor, and the discharge circuitry may include at least one dummy resistor, a group of discharge transistors connected in series with the at least one dummy resistor, and a group of first control transistors operatively connected with gate electrodes of the group of discharge transistors. In an embodiment, a source-drain electrode positioned on one side of the group of first control transistors may be electrically connected with the gate electrodes of the group of discharge transistors via the first divider resistor. In an embodiment, a source-drain electrode positioned on another side of the group of first control transistors may be electrically connected with the gate electrodes of the group of discharge transistors via the second divider resistor.

In an embodiment, the power supply device may include a first controller to switch an electrical connection state of the at least one dummy resistor. In an embodiment, the first controller may provide a first voltage to activate the group of first control transistors to gate electrodes of the group of first control transistors. In an embodiment, the first controller may provide a second voltage to activate the group of discharge transistors to the source-drain electrode positioned on the one side of the first control transistors.

In an embodiment, the second voltage provided to the source-drain electrode positioned on the one side of the first control transistors may not be provided to the gate electrodes of the group of discharge transistors while the group of first control transistors remain in an active state.

In an embodiment, at least a portion of the second voltage provided to the source-drain electrode positioned on the one side of the first control transistors may be provided to the gate electrodes of the group of discharge transistors while the group of first control transistors remain in an inactive state.

In an embodiment, the discharge circuitry may include at least one dummy resistor, a group of discharge transistors connected in series with the at least one dummy resistor, a second control transistor electrically connected with gate electrodes of the group of discharge transistors, and a comparator having an output end connected with a gate electrode of the second control transistor. In an embodiment, a source-drain electrode on one side of the second control transistor may be connected with the gate electrodes of the group of discharge transistors. In an embodiment, a source-drain electrode on an other side of the second control transistor may be connected with a source-drain electrode positioned on an other side of the group of discharge transistors. In an embodiment, the comparator may receive a preset reference voltage through a first input end. In an embodiment, the comparator may receive a sensing voltage detected from a node between the sensing voltage and the source-drain electrode positioned on the other side of the group of discharge transistors through a second input end.

In an embodiment, the electronic device further comprises a sensing resistor, and a source-drain electrode on one side of the group of discharge transistors may be connected with the at least one dummy resistor. In an embodiment, the source-drain electrode positioned on the other side of the group of discharge transistors may be connected with the sensing resistor. In an embodiment, the at least one dummy resistor is electrically connected with one end of the first capacitor, and the sensing resistor may be electrically connected with an other end of the first capacitor.

In an embodiment, the discharge circuitry may include a group of first control transistors. In an embodiment, the source-drain electrode on the one side of the second control transistor may be connected with the gate electrodes of the group of discharge transistors while forming a first node. In an embodiment, the first node may be electrically connected with a second node corresponding to the one side of the group of first control transistors. In an embodiment, a first divider resistor may be disposed between the first node and the second node, and a second divider resistor may be disposed between the first node and the source-drain electrode on the other side of the second control transistor.

In an embodiment, the electronic device further comprises a display and the main body may include a converter circuitry converting the driving voltage received from the power supply device and outputting converted power. In an embodiment, the main body may include a driver controlling a driving of the display based on the converted power. In an embodiment, the main body may include a second controller controlling an operation based on the converted power and the standby voltage.

In an embodiment, the at least one converter may include a first output end electrically connected to the first capacitor and a second output end electrically connected to the second capacitor. In an embodiment, the discharge circuitry may be electrically connected only to the first output end.

In an embodiment, the at least one converter may include a first converter to output the driving voltage and a second converter to output the standby voltage. In an embodiment, the first capacitor is connected to an output end of the first converter, and the second capacitor may be connected to an output end of the second converter. In an embodiment, the discharge circuitry may be electrically connected only to the first output end.

In an embodiment of the disclosure, a power supply device may provide power to a main body (e.g., a display device).

In an embodiment, a power supply device may comprise at least one converter to output at least one of the driving voltage and the standby voltage from an output end. In an embodiment, the power supply device may comprise a first capacitor connected to the at least one converter to store the driving voltage. In an embodiment, the power supply device may comprise a second capacitor connected to the at least one converter to store the standby voltage.

In an embodiment, the electronic device may comprise a discharge circuitry electrically connected with the first capacitor to discharge the driving voltage stored in the first capacitor.

In an embodiment, the discharge circuitry may include at least one dummy resistor, a group of discharge transistors connected in series with the at least one dummy resistor, and a group of first control transistors operatively connected with gate electrodes of the group of discharge transistors.

In an embodiment, the power supply device may include a first divider resistor and a second divider resistor, and a source-drain electrode positioned on one side of the group of first control transistors may be electrically connected with the gate electrodes of the group of discharge transistors via the first divider resistor and a source-drain electrode positioned on another side of the group of first control transistors may be electrically connected with the gate electrodes of the group of discharge transistors via the second divider resistor.

As such, the device according to an embodiment of the disclosure may prevent heat generation due to a dummy resistor by electrically connecting an active transistor to the dummy resistor. Further, the device according to an embodiment of the disclosure may prevent subsequent heat generation due to degradation of the transistor connected with the dummy resistor by adopting a structure in which a plurality of transmission RF signal are coupled as a group.

Effects of the present disclosure are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Figure 1:
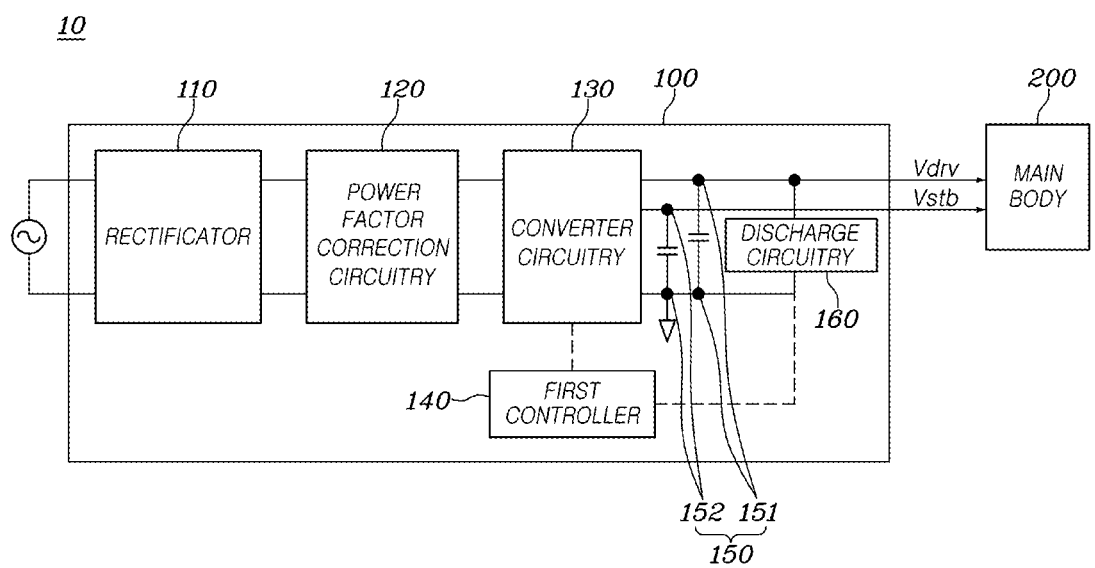
FIG. 1 is a block diagram illustrating an electronic device according to an embodiment of the disclosure.

Reference may be made to the accompanying drawings in the following description, and specific examples that may be practiced are shown as examples within the drawings. Other examples may be utilized and structural changes may be made without departing from the scope of the various examples.

DETAILED DESCRIPTION

Embodiments of the present disclosure are now described with reference to the accompanying drawings in such a detailed manner as to be easily practiced by one of ordinary skill in the art. However, the present disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

The disclosure provides a circuit having a structure capable of preventing heat generation in a dummy resistor used in a power supply device. An electronic device or power supply device according to an embodiment may have such a circuit.

FIG. 1 is a block diagram illustrating an electronic device according to an embodiment of the disclosure.

According to an embodiment, an electronic device 10 may include a main body 200 and a power supply device 100.

In an embodiment, the power supply device 100 may be provided inside the main body 200 or provided outside the main body 200. The power supply device 100 provided inside the main body 200 may be referred to as a power supplier. The power supply device 100 provided outside the main body 200 may be electrically connected to the main body 200. For example, the power supply device 100 may be connected to the main body 200 through a cable. For example, the power supply device 100 may wirelessly transfer power to the main body 200. In the disclosure, the means to transfer power to the main body 200 by the power supply device 100 is not limited to the above-described example.

In an embodiment, the power supply device 100 may be configured as at least some components of the main body 200. The power supply device 100 built in the main body 200 may be referred to as a power supplier. The power supplier may be electrically connected to at least some of the other components of the main body 200 (e.g., the rectificator 210, the driver 220, and the second controller(s) 240), but is not limited thereto.

In an embodiment, the electronic device 10 may be implemented as a display system. In this case, the main body 200 may be a display device. The display device may include, e.g., a television, a monitor, and an electronic blackboard, but is not limited thereto.

In an embodiment, the power supply device 100 may include a rectificator 110, a power factor correction circuitry 120, and a converter circuitry 130.

In an embodiment, the rectificator 110 may convert an input AC voltage into a DC voltage. The rectificator 110 may rectify and smooth the AC voltage into a DC voltage of a predetermined level. In an embodiment, a half-wave circuit or a full-wave circuit may be used for rectification. In an embodiment, a capacitor may be connected in parallel to the output end of the rectificator 110 for smoothing.

In an embodiment, the power factor correction circuitry 120 may adjust the power factor of the DC voltage input from the rectificator 110. In an embodiment, the power factor correction circuitry 120 may output a power factor-adjusted DC voltage. In an embodiment, the power factor correction circuitry 120 may correct the phase and shape of the DC voltage input from the rectificator 110 to reduce reactive power. In an embodiment, the power factor correction circuitry 120 may output a DC voltage through the capacitor connected to the output end.

Figure 3:
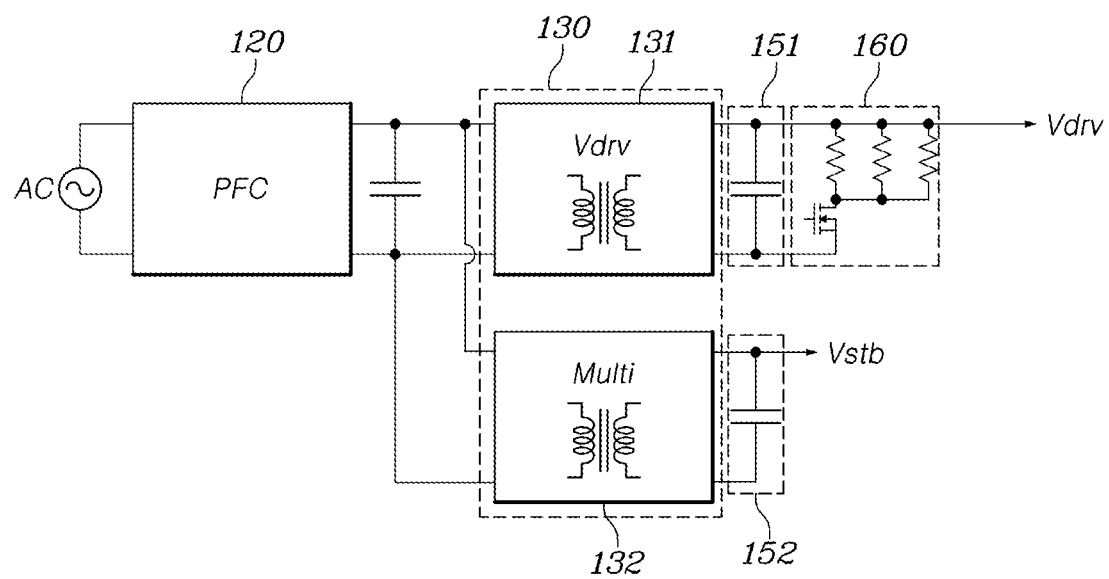
FIGS. 3 and 4 are block diagrams illustrating a power supply device according to an embodiment of the disclosure.
Figure 4:
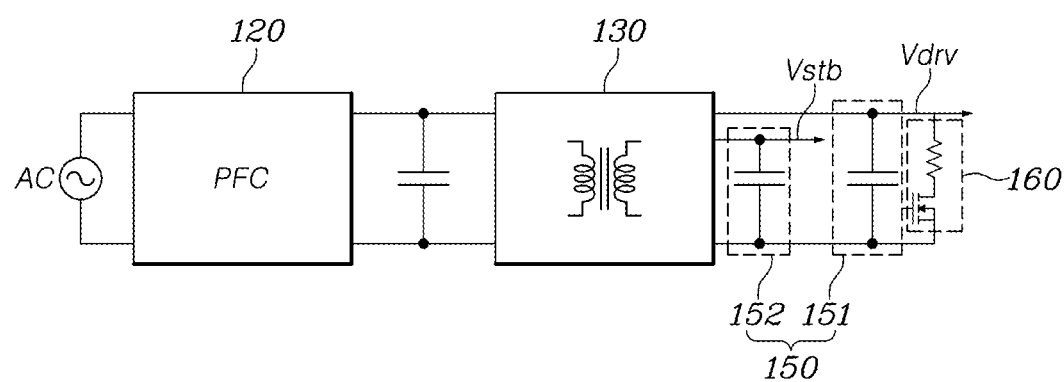

In an embodiment, the converter circuitry 130 may generate a driving voltage Vdrv by converting the input DC voltage. In an embodiment, the converter circuitry 130 may include two or more converter circuitrys 130 (e.g., a driving converter circuitry 131 and a multi-converter circuitry 132) as illustrated in FIG. 3. In an embodiment, the converter circuitry 130 may include one converter circuitry 130 (e.g., DC/DC converter circuitry) as illustrated in FIG. 4. The converter circuitry 130 is described below with reference to FIGS. 3 and 4.

In an embodiment, the converter circuitry 130 may generate a driving voltage Vdrv and a standby voltage Vstb by converting the input DC voltage. In an embodiment, the converter circuitry 130 may include one or more output ends 150. For example, the converter circuitry 130 may include a first output end 151 for outputting the driving voltage Vdrv and a second output end 152 for outputting the standby voltage Vstb. In an embodiment, the converter circuitry 130 may output the driving voltage Vdrv or the standby voltage Vstb from the first output end 151 or the second output end 152.

In an embodiment, a first capacitor may be electrically connected to two opposite ends of the first output end 151 of the converter circuitry 130. In an embodiment, a second capacitor may be electrically connected to two opposite ends of the second output end 152 of the converter circuitry 130. In an embodiment, the driving voltage Vdry may be stored in the first capacitor connected to the first output end 151. In an embodiment, the standby voltage Vstb may be stored in the second capacitor connected to the second output end 152.

In an embodiment, the power supply device 100 may include a discharge circuitry 160. The discharge circuitry 160 may be connected to the output end 150 of the converter circuitry 130. In an embodiment, the discharge circuitry 160 may be electrically connected to two opposite ends of the first capacitor associated with the driving voltage Vdrv. The discharge circuitry 160 may be connected to two opposite ends of the first capacitor to discharge the driving voltage Vdrv stored in the first capacitor.

In an embodiment, the driving voltage Vdrv and the standby voltage Vstb output from the converter circuitry 130 may be provided to the main body 200. The main body 200 may operate based on the driving voltage Vdrv and the standby voltage Vstb provided or received from the power supply device 100. Without limitations thereto, as an example, the main body 200 may turn on the display panel by the driving voltage Vdrv provided from the power supply device 100. For example, the main body 200 may maintain the provided microphone in an active state by the standby voltage Vstb provided from the power supply device 100 and may perform speech recognition based on the speech received through the microphone.

In an embodiment, the controller provided in the power supply device 100 may be referred to as a first controller 140. The controller provided in the main body 200 may be referred to as a second controller. In an embodiment, when the power supply device 100 is implemented as at least a portion of the main body 200, the first controller 140 may be integrally configured with the second controller (240 in FIG. 2), but is not limited thereto.

In an embodiment, the first controller 140 may be connected to at least one of the converter circuitry 130 and the discharge circuitry 160. In an embodiment, the first controller 140 may transmit electrical signals for controlling the converter circuitry 130 and the discharge circuitry 160. The electrical signal for controlling the converter circuitry 130 and the discharge circuitry 160 may have a predetermined voltage.

In an embodiment, the first controller 140 may include one or more of a central processing unit (CPU), a micro controller unit (MCU), a micro processing unit (MPU), an application processor (AP), a communication processor (CP), or an ARM processor, or may be defined as the term. Further, the first controller 140 may be implemented as a system on chip (SoC) embedding a processing algorithm or large scale integration (LSI) or be implemented in the form of a field programmable gate array (FPGA). Further, the first controller 140 may be configured as a processing circuitry for implementing the above-described form.

Figure 2:
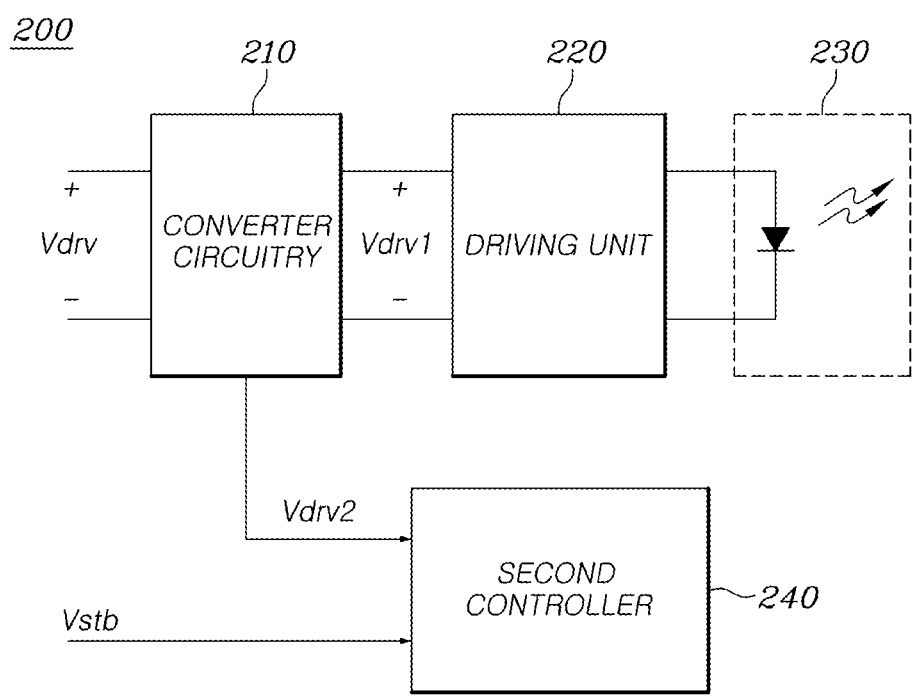
FIG. 2 is a block diagram illustrating a main body according to an embodiment of the disclosure.

FIG. 2 is a block diagram illustrating a main body according to an embodiment of the disclosure.

Referring to FIG. 2, a main body 200 may include a converter circuitry 210, a driver 220, a display 230 and a second controller 240. The main body 200 may further include other general-purpose components, such as a user input device and a sensor(s).

In an embodiment, the converter circuitry 210 may convert the received driving voltage Vdrv and provide the converted voltages (e.g., the first conversion voltage Vdrv1 and the second conversion voltage Vdrv2) to the components, e.g., the driver 220 and/or the second controller 240, of the main body 200.

In an embodiment, the driver 220 may drive the display 230 by the converted first conversion voltage Vdrv1 received from the converter circuitry 210. In an embodiment, the driver 220 may drive each pixel by applying a voltage or current to each pixel constituting the display 230 based on control by the second controller 240. The display 230 may be implemented as a liquid crystal display (LCD), an organic LED (OLED), an active-matrix OLED (AMOLED), a plasma display panel (PDP), a quantum dot (QD), a micro LED, or other various types of flat panel displays or flexible displays.

In an embodiment, the second controller 240 may include one or more of a central processing unit (CPU), a micro controller unit (MCU), a micro processing unit (MPU), an application processor (AP), a communication processor (CP), or an ARM processor, or may be defined as the term. Further, the second controller 240 may be implemented as a system on chip (SoC) embedding a processing algorithm or large scale integration (LSI) or be implemented in the form of a field programmable gate array (FPGA). Further, the second controller 240 may be configured as a processing circuitry for implementing the above-described form.

In an embodiment, the second controller 240 may control the overall operation of the main body 200 by the second conversion voltage Vdrv2 and/or the standby voltage Vstb provided from the power supply device (100 in FIG. 1). For example, the processor may copy various software programs or instructions stored in memory to RAM and run them to perform various operations.

In an embodiment, the main body 200 may include a memory. Here, the memory may store various software programs (or applications) for the main body 200 to operate, data and instructions for the operation of the main body 200. At least some of the programs may be downloaded from an external server through wireless or wired communication or provided from the power supply device. The memory may be accessed by a processor, and the processor may read/write/modify/delete/update the software programs, data, and instructions included in the memory.

FIGS. 3 and 4 are block diagrams illustrating a power supply device according to an embodiment of the disclosure.

The following description focuses on differences shown in FIGS. 3 and 4 except for those described above in connection with the power supply device 100 of FIG. 1.

Referring to FIG. 3, in an embodiment, the converter circuitry 130 may include a driving converter circuitry 131 outputting a driving voltage and a multi-converter circuitry 132 outputting a standby voltage. In an embodiment, a first capacitor may be connected to the output end 151 of the driving converter circuitry 131. In an embodiment, a second capacitor may be connected to the output end 152 of the multi-converter circuitry 132. In an embodiment, the discharge circuitry 160 may be electrically connected only to the first output end 151 of the driving converter circuitry 131.

Referring to FIG. 4, in an embodiment, the converter circuitry 130 may include a first output end 151 electrically connected to the first capacitor and a second output end 152 electrically connected to the second capacitor. In an embodiment, the discharge circuitry 160 may be electrically connected only to the first output end 151. FIG. 4 illustrates an example in which one dummy resistor is coupled to the discharge circuitry 160 but, without limitations thereto, two or more dummy resistors may be further coupled in series or parallel.

Figure 5:
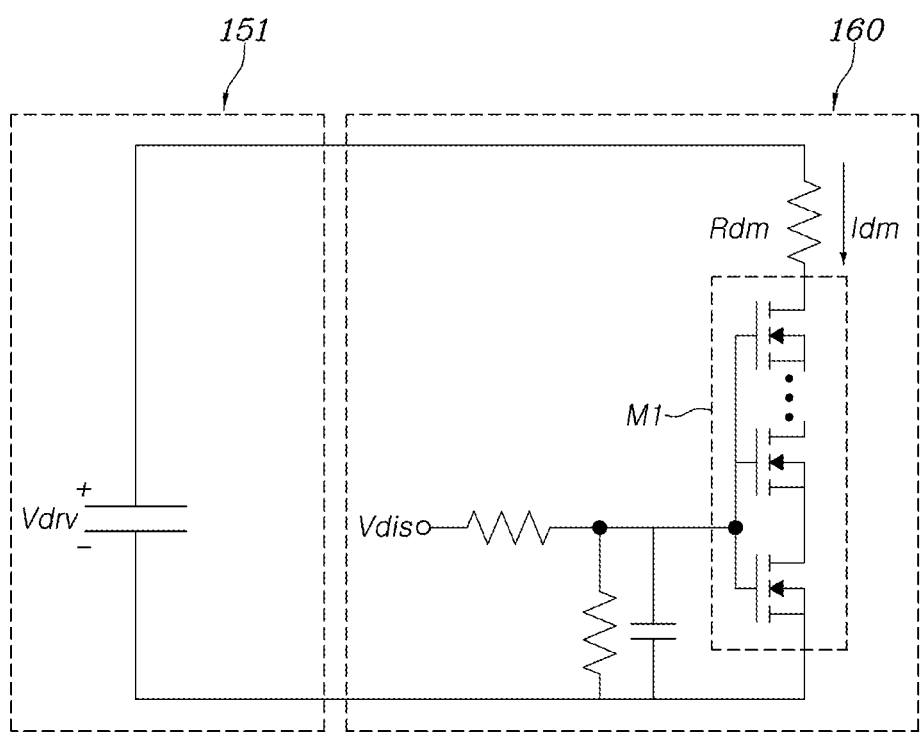
FIG. 5 is a view schematically illustrating a driving voltage and a discharge circuitry according to an embodiment of the disclosure.

FIG. 5 is a view schematically illustrating a driving voltage and a discharge circuitry according to an embodiment of the disclosure.

In an embodiment, the discharge circuitry may include one or more dummy resistors Rdm and a group of discharge transistors M1 connected in series with the dummy resistors Rdm. The group of discharge transistors M1 may be arranged, e.g., in a form in which source-drain electrodes are connected in series.

In an embodiment, the gate electrodes of the group of discharge transistors M1 may be jointly connected through one node. In an embodiment, the source-drain electrode positioned on one side of the group of discharge transistors M1 may be electrically connected to the dummy resistor Rdm. For example, a transistor positioned on one side among the group of discharge transistors M1 may be electrically connected through the dummy resistor Rdm through the source-drain electrode, and the remaining discharge transistors may not be electrically connected to the dummy resistor Rdm.

In an embodiment, one end of the dummy resistor Rdm may be electrically connected to one end of the first capacitor. For example, one end of the dummy resistor Rdm may be electrically connected to one end of the first capacitor, and the other end of the dummy resistor Rdm may be electrically connected to the source-drain electrodes of the above-described discharge transistor.

In an embodiment, the source-drain electrode positioned on the other side of the group of discharge transistors M1 may be electrically connected to the other end of the first capacitor.

In an embodiment, the power supply device may include a first controller for switching an electrical connection state of the dummy resistor Rdm. In an embodiment, the first controller may provide a voltage Vdis for activating the group of discharge transistors M1 electrically connected to the dummy resistor Rdm. For example, the first controller may provide the voltage Vdis for activating the group of discharge transistors M1 to the node commonly formed by the gate electrodes of the group of discharge transistors M1.

In an embodiment, the source-drain electrode positioned on the other side of the group of discharge transistors M1 may be electrically connected to the gate electrodes of the group of discharge transistors M1 with one or more resistors interposed therebetween. As such, the resistor disposed in between may act as a resistor divider. For example, if the first controller provides the voltage Vdis to the gate electrodes of the group of discharge transistors M1, the provided voltage may be voltage-divided by the one or more resistors disposed between the gate electrodes and the source-drain electrodes. Accordingly, a predetermined voltage may be applied to the gate electrode. Here, the predetermined voltage to be provided to the gate electrode may have a voltage value sufficient to activate the group of discharge transistors M1.

In an embodiment, the source-drain electrode positioned on the other side of the group of discharge transistors M1 may be electrically connected to the gate electrodes of the group of discharge transistors M1 with one or more capacitors interposed therebetween. In an embodiment, the capacitor may store the voltage Vdis provided by the first controller. Since the capacitor is connected in series with the resistor, the voltage value applied to the capacitor during the time when the supply of the voltage Vdis is stopped may be reduced based on the RC value. As the voltage applied to the capacitor decreases, the group of discharge transistors M1 may be deactivated again.

Meanwhile, while the group of discharge transistors M1 are maintained in an active state, the driving voltage Vdrv stored in the first capacitor may be gradually reduced by the dummy resistor Rdm. As the group of discharge transistors M1 are activated, a dummy current Idm flows through the dummy resistor Rdm, and the voltage stored in the first capacitor may be turned into another type of energy, such as heat, and released.

Figure 6:
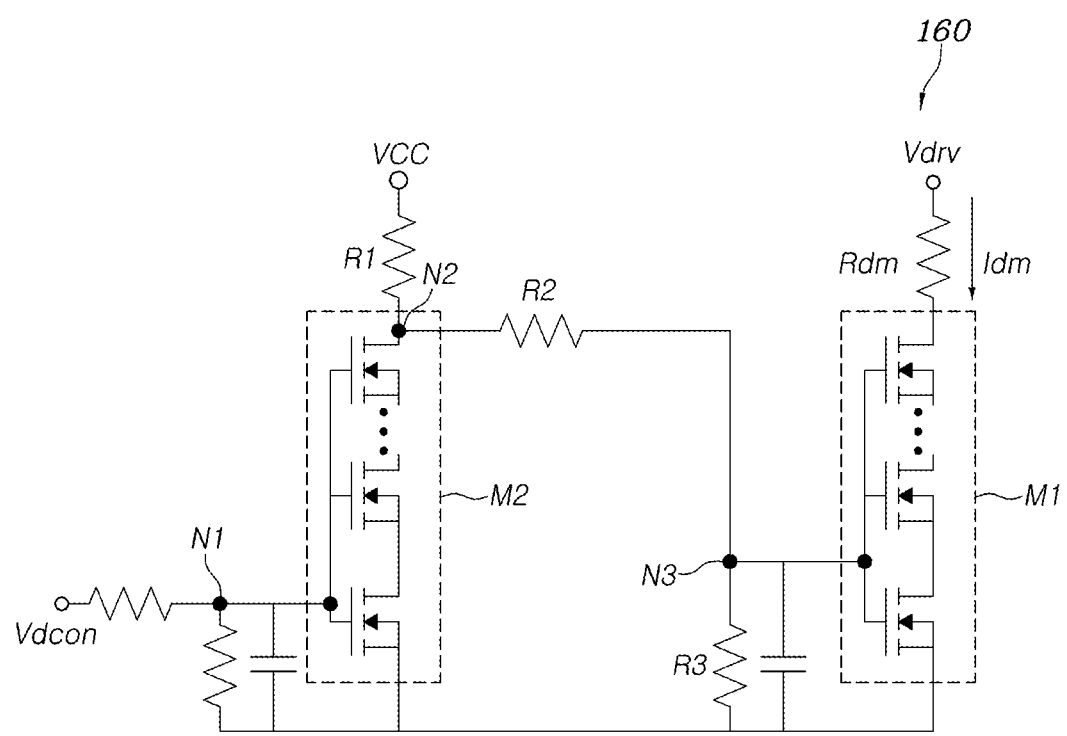
FIG. 6 is a circuit diagram illustrating a discharge circuitry according to an embodiment of the disclosure.

FIG. 6 is a circuit diagram illustrating a discharge circuitry according to an embodiment of the disclosure.

In an embodiment, the discharge circuitry 160 may include one or more dummy resistors Rdm, a group of discharge transistors M1 connected in series with the dummy resistor Rdm, and a group of first control transistors M2 operatively connected with the gate electrodes of the group of discharge transistors M1.

In an embodiment, the gate electrodes of the group of first control transistors M2 may be electrically connected to the first voltage Vdcon. The first voltage Vdcon is a voltage for switching the active/inactive state of the group of first control transistors M2. In an embodiment, the first voltage Vdcon may be received from the first controller. In other words, the first controller may control the active/inactive state of the first control transistors M2 through an electrical signal having the first voltage Vdcon. In the disclosure, the gate electrodes of the group of first control transistors M2 may be connected to share one node. The group of first control transistors M2 may be electrically connected to the first node N1. Here, the first voltage Vdcon may be provided to the first node N1.

In an embodiment, a source-drain electrode positioned on one side of the group of first control transistors M2 may be electrically connected to the gate electrodes of the group of discharge transistors M1 via a first divider resistor R2. For example, the source-drain electrode positioned on one side of the group of first control transistors M2 may be connected to the second voltage VCC through an input resistor R1. For example, the source-drain electrode positioned on one side of the group of first control transistors M2 may be connected to the gate electrodes of the group of discharge transistors M1 via a first divider resistor R2.

In an embodiment, the source-drain electrode positioned on the other side of the group of first control transistors M2 may be electrically connected to the gate electrodes of the group of discharge transistors M1 via a second divider resistor R3.

In an embodiment, the input resistor R1, the first divider resistor R2, and the source-drain electrode positioned on the one side of the group of first control transistors M2 may be connected to share a second node N2. Further, the gate electrodes of the group of discharge transistors M1 may be connected to share a third node N3. Further, the first divider resistor R2 and the second divider resistor R3 may be connected through the third node N3.

In an embodiment, the first controller may provide the second voltage VCC to the second node N2. The voltage VCC provided to the second node N2 may be voltage-divided by the input resistance R1, the first divider resistor R2, and the second divider resistor R3 while the group of first control transistors M2 are maintained in an inactive state. However, the voltage VCC provided to the second node N2 may not be voltage-divided to the third node N3 while the group of first control transistors M2 are maintained in an active state. As such, a voltage may or may not be applied to the gate electrodes (i.e., the third node N3) of the group of discharge transistors M1 depending on the active or inactive state of the group of first control transistors M2.

In an embodiment, the second voltage VCC may be provided to the discharge circuitry 160 by the first controller, but is not limited thereto. For example, the power supply device may include a first controller for switching an electrical connection state of the dummy resistor Rdm. For example, the first controller may provide the first voltage Vdcon for activating the group of first control transistors M2 to the gate electrodes of the group of first control transistors M2. Further, the first controller may provide the second voltage VCC for activating the group of discharge transistors M1 to source-drain electrodes positioned on the one side of the first control transistors.

In an embodiment, while maintaining the active state of the group of first control transistors M2, the second voltage provided to the source-drain electrode positioned on the one side of the first control transistor may not be provided to the gate electrodes of the group of discharge transistors M1. In an embodiment, while maintaining the inactive state of the group of first control transistors M2, at least a portion of the second voltage provided to the source-drain electrode positioned on the one side of the group of first control transistors may be provided to the gate electrodes of the group of discharge transistors M1.

According to an embodiment, the discharge transistors M1 may be activated while the first control transistors M2 are maintained in an inactive state. Only when the discharge transistors M1 are maintained in an active state, the dummy current Idm flows through the dummy resistor Rdm, and the driving voltage Vdrv stored in the first capacitor (refer to FIG. 5) may be discharged.

Figure 7:
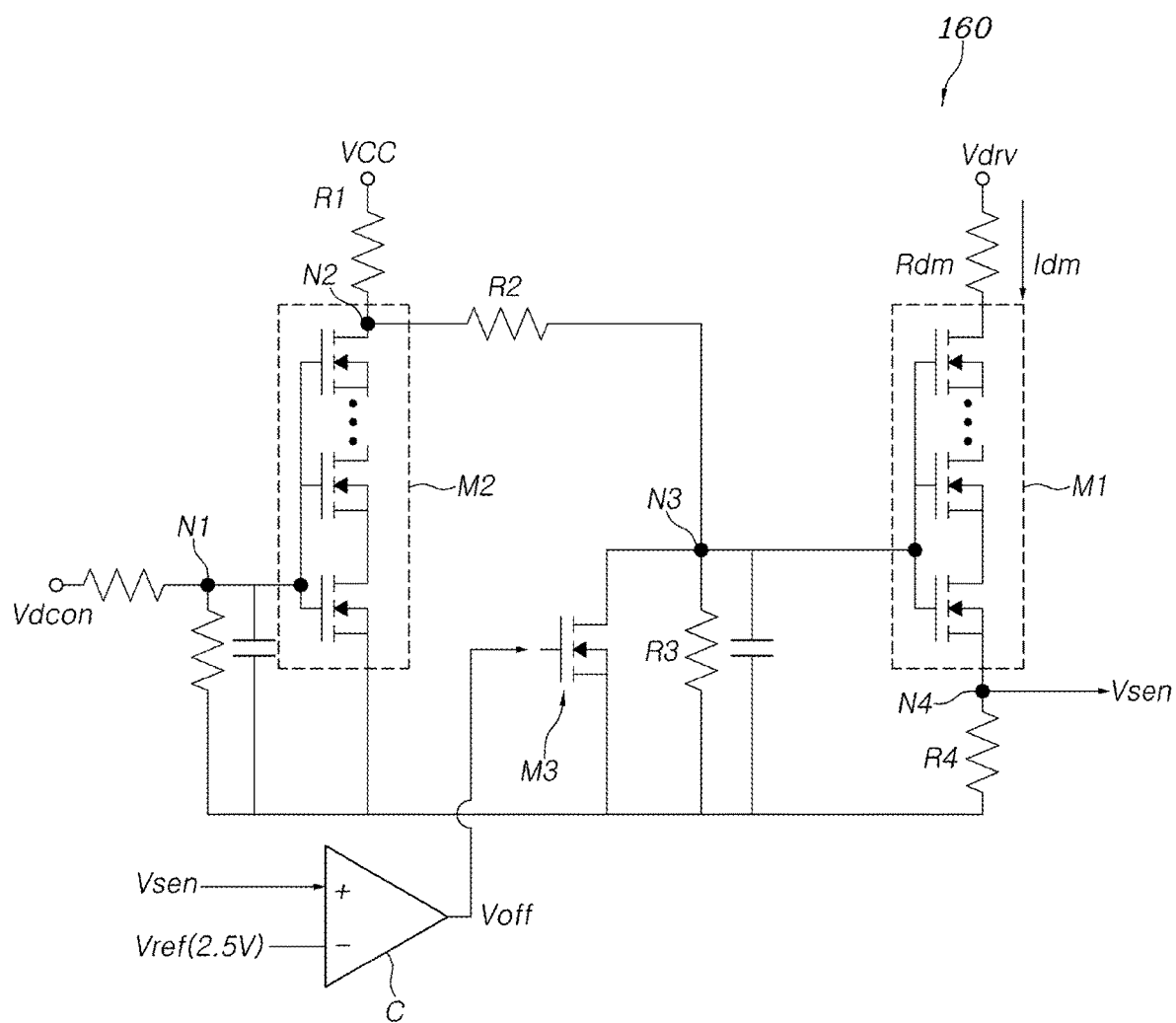
FIG. 7 is a circuit diagram illustrating a discharge circuitry according to an embodiment of the disclosure.

FIG. 7 is a circuit diagram illustrating a discharge circuitry according to an embodiment of the disclosure.

In an embodiment, the discharge circuitry 160 shown in FIGS. 5 and 6 may further include a component for protecting the entire circuit from overcurrent flowing through the dummy resistor Rdm. In one case, when the dummy resistor Rdm is damaged, ignition of the resistor due to heat generation of the resistor itself cannot be prevented. Accordingly, when the resistance is reduced to damage to the resistor, the configuration needs to be made not to flow current through the dummy resistor Rdm.

In an embodiment, the discharge circuitry 160 may include one or more dummy resistors Rdm, a group of discharge transistors M1 connected in series with the dummy resistor Rdm, a second control transistor M3 electrically connected with the gate electrodes of the group of discharge transistors M1, and a comparator C whose output end is connected with the gate electrode of the second control transistor M3.

In an embodiment, the discharge circuitry 160 may further include a group of first control transistors M2, but an embodiment of the disclosure is not limited thereto. As described above, without limitations thereto, the discharge circuitry 160 may include a group of first control transistors M2. In an embodiment, the source-drain electrode on the one side of the second control transistor M3 may be connected with the gate electrodes of the group of discharge transistors M1 while forming a third node N3. In an embodiment, the third node N3 may be electrically connected with the second node N2. In an embodiment, a first divider resistor R2 may be disposed between the first node N1 and the second node N2. In an embodiment, a second divider resistor R3 may be disposed between the first node N1 and the source-drain electrode on the other side of the second control transistor M3. In an embodiment, the group of first control transistors M2 may be understood by referring to the above-described description in connection with FIG. 6.

Meanwhile, in an embodiment, as the source-drain electrode of the second control transistor M3 is connected to the third node N3, the active or inactive state of the second control transistor M3 may determine the magnitude of the voltage applied to the third node N3. For example, a voltage sufficient to activate the group of discharge transistors M1 may not be applied to the third node N3 while the second control transistor M3 is maintained in an active state. For example, a voltage sufficient to activate the group of discharge transistors M1 may be applied to the third node N3 while the second control transistor M3 is maintained in an inactive state.

In an embodiment, the source-drain electrode on the other side of the second control transistor M3 may be connected with the source-drain electrode positioned on the other side of the group of discharge transistors M1 via the sensing resistor R4. The sensing resistor R4 may be electrically connected with the source-drain electrode positioned on the other side of the group of discharge transistors M1 while forming the fourth node N4. In an embodiment, the voltage detected at the fourth node N4 may be provided to the input end of the comparator C. The voltage detected at the fourth node N4 may be referred to as a sensing voltage Vsen.

In an embodiment, the source-drain electrode positioned on the other side of the first control transistors M1, the source-drain electrode positioned on the other side of the second control transistor M3, and the second divider resistor R3 and the sensing resistor R4 may be connected to share one node.

Meanwhile, in an embodiment, the comparator C may be configured to control the active/inactive state of the second control transistor M3 based on the sensing voltage Vsen detected at the fourth node N4 and a preset reference voltage Vref. For example, while the magnitude of the preset reference voltage Vref remains larger than the magnitude (e.g., 2.5V) of the sensing voltage Vsen, the comparator C may control the second control transistor M3 to the inactive state. For example, while the magnitude of the preset reference voltage Vref remains smaller than the magnitude of the sensing voltage Vsen, the comparator C may control the second control transistor M3 to the active state. While the second control transistor M3 is maintained in an active state, a voltage sufficient to maintain the group of discharge transistors M1 in an active state is not applied to the third node N3. Accordingly, the group of discharge transistors M1 are switched into an inactive state, and no current flows through the dummy resistor Rdm and the fourth node N4. As the current does not flow through the dummy resistor Rdm, overheating or ignition due to the flow of overcurrent in the dummy resistor Rdm may be prevented.

Without limitations thereto, a circuit element (not shown) for providing the voltage for maintaining the second control transistor M3 in an active state for a predetermined time may be connected to the output end of the comparator C. For example, one or more resistors and one or more capacitors connected in parallel with the resistors may be electrically connected to the output end of the comparator C.

Without limitations thereto, in an embodiment, one or more resistors and one or more capacitors (not shown) connected in parallel with the resistors (not shown) may be electrically connected to the gate electrode of the second control transistor M2. In an embodiment, the gate electrodes of the group of discharge transistors M1, the group of first control transistors M2 and the second control transistor M3 may be all electrically connected with the one or more resistors and one or more capacitors connected in parallel with the resistors. In an embodiment, the resistors and capacitors electrically connected to the gate electrodes of the group of discharge transistors M1, the group of first control transistors M2 and the second control transistor M3, respectively, may be connected through one common node.

Without limitations thereto, in an embodiment, one or more capacitors (not shown) may be connected in parallel to the sensing resistor R4. For example, one end of one or more capacitors connected in parallel with the sensing resistor R4 may be electrically connected to the fourth node N4. In an embodiment, charge due to overcurrent may be stored in one or more capacitors. Here, the sensing voltage Vsen of the fourth node N4 may be determined based on the charge stored in the capacitor. The determined voltage Vsen may be provided to the input end of the comparator C.

Meanwhile, in an embodiment, the comparator C may be configured to include an operational amplifier (Op-Amp) as at least a portion thereof. In an embodiment, the operational amplifier may receive a preset reference voltage Vref through a first input end and receive the sensing voltage Vsen detected from the node between the source-drain electrode positioned on the other side of the group of discharge transistors M1 and the sensing resistor R4 through a second input end. In an embodiment, the operational amplifier may be configured to output a voltage having a magnitude capable of activating the second control transistor M3 when the magnitude of the reference voltage is larger than the magnitude of the sensing voltage Vsen. In an embodiment, the operational amplifier may be configured to output a voltage having a magnitude incapable of activating the second control transistor M3 when the magnitude of the reference voltage is smaller than the magnitude of the sensing voltage Vsen.

The electronic device according to various embodiments may be one of various types of electronic devices. The electronic devices may include, for example, a display device, a portable communication device (e.g., a smartphone), a computer device, a portable multimedia device, a portable medical device, a camera, a wearable device, or a home appliance. According to an embodiment of the present disclosure, the electronic device is not limited to the above-listed embodiments.

It should be appreciated that various embodiments of the present disclosure and the terms used therein are not intended to limit the technological features set forth herein to particular embodiments and include various changes, equivalents, or replacements for a corresponding embodiment. As used herein, the singular forms "a," "an," and "the" are intended to include the plural forms as well, unless the context clearly indicates otherwise. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

As used herein, the term "part" or "module" may include a unit implemented in hardware, software, or firmware, and may interchangeably be used with other terms, for example, "logic," "logic block," "part," or "circuitry". A part or module may be a single integral component, or a minimum unit or part thereof, adapted to perform one or more functions. For example, according to an embodiment, 'part' or 'module' may be implemented in a form of an application-specific integrated circuit (ASIC).

As used in various embodiments of the disclosure, the term "if" may be interpreted as "when," "upon," "in response to determining," or "in response to detecting," depending on the context. Similarly, "if A is determined" or "if A is detected" may be interpreted as "upon determining A" or "in response to determining A", or "upon detecting A" or "in response to detecting A", depending on the context.

The program executed by the electronic device 100 described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable storage media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable storage media may be distributed to computer systems connected via a network, and computer-readable codes may be stored and executed in a distributed manner. The computer program may be distributed (e.g., downloaded or uploaded) via an application store (e.g., Play Store™), directly between two UEs (e.g., smartphones), or online. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
a power supply device to generate a driving voltage and a standby voltage; and
a main body operated based on the driving voltage and the standby voltage received from the power supply device,
wherein the power supply device includes:
at least one converter to output at least one of the driving voltage and the standby voltage from an output end;
a first capacitor connected to the at least one converter to store the driving voltage;
a second capacitor connected to the at least one converter to store the standby voltage;
a first divider resistor;
a second divider resistor; and
a discharge circuitry electrically connected with the first capacitor to discharge the driving voltage stored in the first capacitor;
wherein the discharge circuitry includes:
at least one dummy resistor;
a group of discharge transistors connected in series with the at least one dummy resistor; and
a group of first control transistors operatively connected with gate electrodes of the group of discharge transistors, and
wherein a source-drain electrode positioned on one side of the group of first control transistors, is electrically connected with the gate electrodes of the group of discharge transistors via the first divider resistor, and
a source-drain electrode positioned on an other side of the group of first control transistors, is electrically connected with the gate electrodes of the group of discharge transistors via the second divider resistor.

2. The electronic device of claim 1, wherein the power supply device includes a first controller to switch an electrical connection state of the at least one dummy resistor, and
wherein the first controller provides a voltage to activate the group of discharge transistors electrically connected with the at least one dummy resistor.

3. The electronic device of claim 1, wherein the gate electrodes of the group of discharge transistors are jointly connected through one node, and the source-drain electrode on one side of the group of discharge transistors is electrically connected with the at least one dummy resistor.

4. The electronic device of claim 1, wherein the power supply device includes a first controller to switch an electrical connection state of the at least one dummy resistor, and the first controller provides a first voltage to activate the group of first control transistors to gate electrodes of the group of first control transistors and provides a second voltage to activate the group of discharge transistors to the source-drain electrode positioned on the one side of the first control transistors.

5. The electronic device of claim 4, wherein the second voltage provided to the source-drain electrode positioned on the one side of the first control transistors is not provided to the gate electrodes of the group of discharge transistors while the group of first control transistors remain in an active state.

6. The electronic device of claim 4, wherein at least a portion of the second voltage provided to the source-drain electrode positioned on the one side of the first control transistors is provided to the gate electrodes of the group of discharge transistors while the group of first control transistors remain in an inactive state.

7. The electronic device of claim 1, wherein the discharge circuitry further includes:
- a second control transistor electrically connected with gate electrodes of the group of discharge transistors; and
- a comparator having an output end connected with a gate electrode of the second control transistor,
- wherein a source-drain electrode on one side of the second control transistor is connected with the gate electrodes of the group of discharge transistors,
- wherein a source-drain electrode on an other side of the second control transistor is connected with a source-drain electrode positioned on an other side of the group of discharge transistors, and
- wherein the comparator receives a preset reference voltage through a first input end and receives a sensing voltage detected from a node between the sensing voltage and the source-drain electrode positioned on the other side of the group of discharge transistors through a second input end.

8. The electronic device of claim 7, further comprising a sensing resistor,
- wherein the source-drain electrode on the one side of the group of discharge transistors is connected with the at least one dummy resistor,
- the source-drain electrode positioned on the other side of the group of discharge transistors is connected with the sensing resistor, and
- the at least one dummy resistor is electrically connected with one end of the first capacitor, and the sensing resistor is electrically connected with an other end of the first capacitor.

9. The electronic device of claim 7,
- wherein the first node is electrically connected with a second node corresponding to the one side of the group of first control transistors,
- a first divider resistor is disposed between the first node and the second node, and
- a second divider resistor is disposed between the first node and the source-drain electrode on the other side of the second control transistor.

10. The electronic device of claim 1, further comprising a display, wherein the main body includes:
- a converter circuitry to convert the driving voltage received from the power supply device and to output a first converted driving voltage and a second converted driving voltage;
- a driver to control a driving of the display based on the driving voltage; and
- a second controller controlling an operation based on the second converted driving voltage and the standby voltage.

11. The electronic device of claim 1, wherein the at least one converter includes a first output end electrically connected with the first capacitor and a second output end electrically connected with the second capacitor, and
- the discharge circuitry is electrically connected only to the first output end.

12. The electronic device of claim 1, wherein the at least one converter includes a first converter circuitry to output the driving voltage and a second converter circuitry to output the standby voltage,
- the first capacitor is connected to an output end of the first converter circuitry, and the second capacitor is connected to an output end of the second converter circuitry, and
- the discharge circuitry is electrically connected only to the first output end.

13. A power supply device, comprising:
- at least one converter to output at least one of a driving voltage and a standby voltage from an output end;
- a first capacitor connected to the at least one converter to store the driving voltage;
- a second capacitor connected to the at least one converter to store the standby voltage;
- a discharge circuitry electrically connected with the first capacitor to discharge the driving voltage stored in the first capacitor;
- a first divider resistor;
- a second divider resistor; and
- wherein the discharge circuitry includes:
    - at least one dummy resistor;
    - a group of discharge transistors connected in series with the at least one dummy resistor; and
    - a group of first control transistors operatively connected with gate electrodes of the group of discharge transistors, and
- wherein a source-drain electrode positioned on one side of the group of first control transistors is electrically connected with the gate electrodes of the group of discharge transistors via the first divider resistor, and
- a source-drain electrode positioned on an other side of the group of first control transistors is electrically connected with the gate electrodes of the group of discharge transistors via the second divider resistor.

* * * * *